Patented June 21, 1949

2,473,924

UNITED STATES PATENT OFFICE 2,473,924

SYNTHETIC LINEAR POLYAMIDES AND PROCESS FOR RETARDING CRYSTALLIZATION OF SAID POLYAMIDES

Isaac F. Walker, Hockessin, Del., assignor to E. I. du Pont de Nemours & Company, Wilmington, Del., a corporation of Delaware No Drawing. Application July 19, 1946, Serial No. 684,765

7 Claims. (Cl. 260—78)

This invention relates to polymers of the nylon type, and more particularly to such polymers having improved transparency, and to a novel method for preparing them.

Polymers of the nylon type, i. e., synthetic linear polyamides prepared from polymerizable mono-amino carboxylic acids or their amide-forming derivatives, or from suitable diamines and suitable dicarboxylic acids or amide-forming derivatives of dicarboxylic acids, possess a number of properties, such as high, sharp melting points, great toughness, and high tensile strength which makes them of great value in many applications. The preparation and use of such polymers are illustrated in U. S. Patents 2,071,250, 2,071,253, and 2,130,948. The polyamides described in these patents are high molecular weight polyamides which as a class are microcrystalline in structure. While this crystallinity is an advantage in certain applications it is a disadvantage in others, particularly in the formation of transparent molded articles, since the crystallization of the nylon which takes place during the molding step impairs the transparency of the resulting molded article.

It is an object of this invention, therefore, to provide nylons having improved properties. More specifically it is an object of this invention to provide synthetic linear polyamide compositions having improved transparency. A further object resides in a new process for retarding the crystallization of synthetic linear polyamides. Other objects will appear hereinafter.

These objects are accomplished by the invention described herein of unpigmented compositions containing a synthetic linear polyamide and a minor amount by weight of a sulfonated product of the formula $RCOXR'SO_3M$, wherein R is an open chain monovalent hydrocarbon radical containing from 11 to 19 carbon atoms, X is oxygen or tertiary nitrogen, R' is a divalent hydrocarbon radical having 1 to 6 carbon atoms and M is sodium or potassium. The invention also includes the process of retarding the crystallization of synthetic linear polyamides by incorporating in such polyamides the sulfonated products defined above.

The process of this invention is carried out by uniformly blending a molten synthetic linear polyamide with from 0.5% to 10%, and preferably from 1% to 5%, of its weight of a sodium or potassium salt of a sulfonated long chain acid amide or ester of the type defined above. The blending of the nylon and the sulfonated modifier is conveniently carried out by mixing the ingredients in an inert atmosphere, e. g., under a blanket of nitrogen or carbon dioxide, while heating them to a temperature above the melting point of the polyamide but below that at which rapid degradation of the polyamide takes place. The temperature is preferably maintained below 300° C. After a uniform molten mixture is obtained, the actual time depending on the quantity of the ingredients being blended and on the rate of heating being employed, the melt is preferably, but not necessarily, subjected to reduced pressure to remove any bubbles present in it. The uniform melt can be removed from the vessel in which it was blended and used immediately for molding into articles of the desired shape, or can be cooled and stored for later use. When polyamide compositions are prepared in this way, molded into articles of the desired shape and quenched, or cooled rapidly, by immersion in a cold liquid such as ice water, the resulting moldings have a transparency about twice as great as that of articles molded in the same way from the same polyamide with no modifier or even with sulfonated products of types other than those defined above.

The invention is illustrated by the following examples in which the proportions of ingredients are expressed in parts by weight unless otherwise noted.

Example I

Fifty parts of polyhexamethylene adipamide and 2.5 parts of sodium 2-oleatoethanesulfonate are blended at 270–280° C. by stirring alternately under an atmosphere of nitrogen and under reduced pressure in a glass reaction vessel. In about 15 minutes the polymer and modifier form a uniform melt, with no noticeable change in viscosity during this treatment. Nitrogen is admitted to the reaction vessel and the molten composition is poured into a wedge shaped mold which is then plunged into ice water to cool the polymer rapidly. Sections of this wedge shaped molded product up to 40–50 mils (0.040–0.050 inch) in thickness are transparent, while thicker sections are translucent or opaque. Wedge shaped articles molded from the original polyhexamethylene adipamide in the absence of a crystallization inhibitor are transparent up to thicknesses of only about 20–25 mils.

Example II

The process of Example I is repeated with the single exception that only 0.5 part of the sodium 2-oleatoethanesulfonate is used as the modifier. The resulting modified composition is molded in the same way and the resulting wedge shaped article is found to be transparent up to thicknesses of 30 mils.

Example III

Fifty (50) parts of polyhexamethylene adipamide and 2.5 parts of sodium 2-(N-methyloleamido)ethanesulfonate is blended to a uniform melt by the procedure of Example I. The viscosity of the molten mixture is unaffected by this treatment. The resulting melt is formed, by the process of Example I, into a wedge shaped molded article in which sections having a thickness up to 35-40 mils are transparent.

The polyamides used in the practice of this invention comprise the reaction product of a linear polymer-forming composition containing amide-forming groups, for example, those obtained by reacting material consisting essentially of bifunctional molecules, each containing two reactive groups which are complementary to reactive groups in other molecules and which include complementary amide-forming groups. These polyamides can be obtained by the methods given in the previously mentioned patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that these reactants can be replaced by their equivalent amide-forming derivatives. These polycarbonamides have an intrinsic viscosity of at least 0.4, recurring hydrogen-bearing amide groups as an integral part of the main polymer chain, and have an average number of carbons of at least 2 in the segments of the chain separating the amide groups. The preferred polyamides have a unit length (defined as in Patents 2,071,253 and 2,130,948) of at least 7.

Specific examples of other synthetic linear polyamides which can be used in the compositions of this invention include polytetramethylene sebacamide, polypentamethylene adipamide, polypentamethylene sebacamide, polyhexamethylene suberamide, polyoctamethylene adipamide, polydecamethylene carbamide, polyhexamethylene sebacamide, polymerized 6-aminocaproic acid, polymerized 9-aminononanoic acid, and polymerized 11-aminoundecanonoic acid. Interpolyamides prepared from mixtures of amino acids and dibasic acids and diamines can also be used to form the compositions of this invention.

In addition to the particular salts of sulfonated long chain acid amides and esters illustrated in the examples, other sulfonated products having the general formula $RCOXR'SO_3M$, as defined above, can be used in the compositions of this invention. This particular structure is essential for imparting improved transparency to the polyamide. This is shown by the fact that such closely related sulfonated products as the sodium salt of beta-naphthalenesulfonic acid-formaldehyde condensation product and sodium ligninsulfonate, which do not have the above defined structure, are not effective in improving the transparency of the polyamide. The hydrocarbon radical R in the above mentioned formula can be saturated or unsaturated aliphatic, and the hydrocarbon radical R' is alkylene, i. e., a saturated aliphatic divalent radical. The most useful and generally available compounds are those in which the radicals R are undecyl, tridecyl, 8-heptadecenyl, or heptadecyl, and the radical R' is ethylene. Other suitable hydrocarbon radicals within the above mentioned types are undecylenyl, dodecyl, pentadecyl and nonadecyl for R, and methylene, tetramethylene and hexamethylene for R'. Further examples of compounds, corresponding to the previously mentioned formula are potassium stearatomethanesulfonate, potassium 4-(N-ethyllauramido)-tetramethylenesulfonate, sodium 6-lauratohexamethylenesulfonate, sodium 2-palmitatoethanesulfonate, potassium 2-(N-methylstearamido) ethanesulfonate, and sodium 6-oleatohexamethylenesulfonate.

Because of their improved transparency, the products of this invention are particularly useful for the manufacture of transparent plastics and in other applications in which transparency is an important factor.

As many apparently widely different embodiments of this invention may be made without departing from the spirit and scope thereof, it is to be understood that I do not limit myself to the specific embodiments thereof except as defined in the appended claims.

I claim:

1. A process for obtaining synthetic linear polyamides in which the normally occurring crystallization is retarded, said process comprising blending the molten polyamide with from 0.5% to 10% of its weight of a sulfonated compound of the formula $RCOXR'SO_3M$, wherein R is an open chain monovalent hydrocarbon radical having from 11 to 19 carbon atoms, R' is a divalent saturated aliphatic hydrocarbon radical having from 1 to 6 carbon atoms, M is a metal selected from the group consisting of sodium and potassium, and X is an element selected from the group consisting of oxygen and tertiary nitrogen said nitrogen having a substituent selected from the group consisting of methyl and ethyl groups, said polyamide having an intrinsic viscosity of at least 0.4, recurring amide groups as an integral part of the main polymer chain, and an average number of carbon atoms of at least two in the segments of the chain separating the amide groups.

2. A composition of matter comprising a synthetic linear polyamide blended with from 0.5% to 10% of its weight of a sulfonated compound of the formula $RCOXR'SO_3M$, wherein R is an open chain monovalent hydrocarbon radical having from 11 to 19 carbon atoms, R' is a divalent saturated aliphatic hydrocarbon radical having from 1 to 6 carbon atoms, M is a metal selected from the group consisting of sodium and potassium, and X is an element selected from the group consisting of oxygen and tertiary nitrogen said nitrogen having a substituent selected from the group consisting of methyl and ethyl groups, said polyamide having an intrinsic viscosity of at least 0.4, recurring amide groups as an integral part of the main polymer chain, and an average number of carbon atoms of at least two in the segments of the chain separating the amide groups.

3. The composition defined in claim 2 in which said sulfonated compound is sodium 2-oleatoethanesulfonate.

4. The composition defined in claim 3 in which said polyamide is polyhexamethylene adipamide.

5. The composition defined in claim 2 in which said sulfonated compound is sodium 2-(N-methyloleamido) ethanesulfonate.

6. The composition defined in claim 5 in which said polyamide is polyhexamethylene adipamide.

7. The composition defined in claim 2 in which said polyamide is polyhexamethylene adipamide.

ISAAC F. WALKER.

No references cited.